Jan. 28, 1958     K. J. HORSTMANN ET AL     2,821,093
TIMING DEVICE DIAL PLATE
Filed April 1, 1954     2 Sheets-Sheet 2
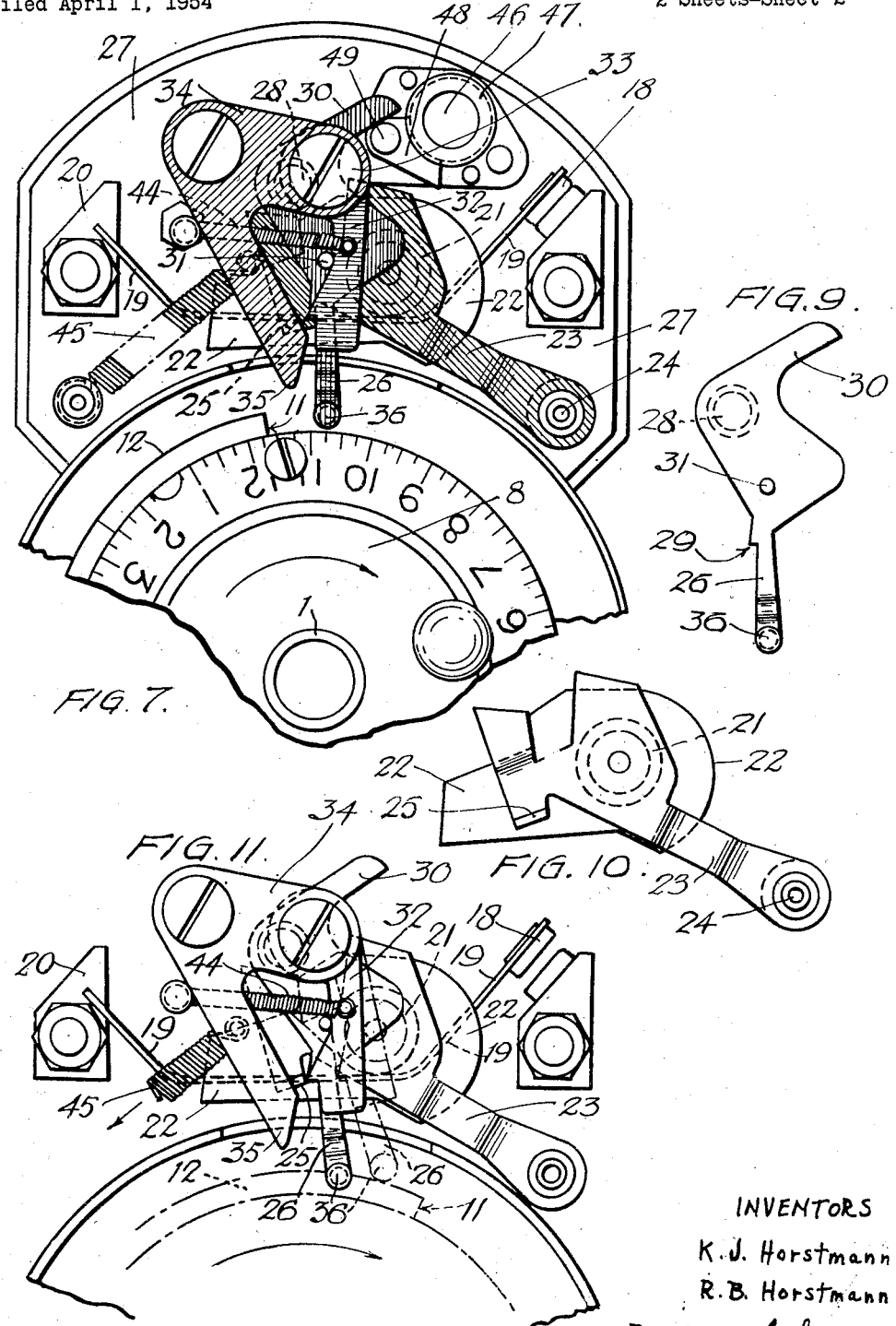
INVENTORS
K. J. Horstmann
R. B. Horstmann
By Emery L. Groff
Attorney

United States Patent Office 2,821,093
Patented Jan. 28, 1958

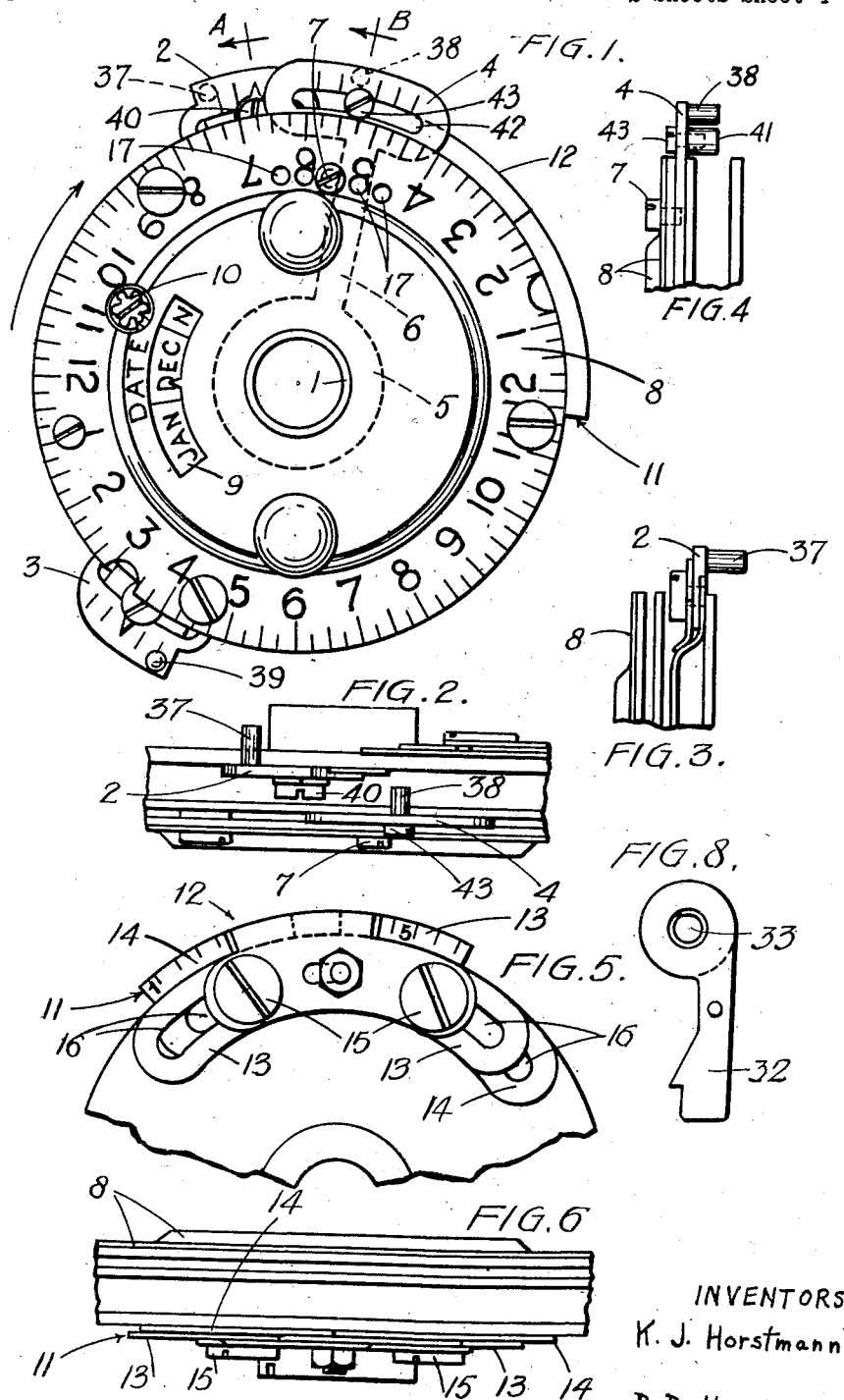

2,821,093
TIMING DEVICE DIAL PLATE

Kenneth John Horstmann and Ronald Blessley Horstmann, Bath, England

Application April 1, 1954, Serial No. 420,414

6 Claims. (Cl. 74—568)

This invention relates to improvements in timing devices of the type in which a spring clockwork or electric motor drives a graduated dial plate in time-regulated manner, and the dial plate is fitted with a number of projecting cams or levers, generally called tappets which are adjustable around its periphery serving to actuate an electric switch into on and off positions, or a gas or other valve into open and closed positions. The dial plate is usually rotated once in twenty-four hours and the adjustable tappets are pre-set according to any requisite timing schedule, e. g. applicable to the lighting or extinguishing of street and other lamps. For convenience, the following description and claims will refer to the "on" and "off" positions of an electric switch controlled by the tappets, but it is to be understood that a gas or other valve can equally well be operated by the tappets into "open" and "closed" positions (corresponding to "on" and "off" respectively).

It frequently happens that one or more of the tappets, particularly the switching-on-tappets, is or are not required during certain periods of the run of the mechanism; for instance, in a four tappet switch giving "on" and "off" alternately, an operating schedule may require the second "on" to be dispensed with over a certain period of the schedule. The object of the invention is to provide means, settable according to any particular timing schedule, which will automatically render a tappet (or tappets) inoperative.

The invention is applicable to timing devices having a dial plate in which the position of a pair of tappets on the dial, after first being set, is automatically variable to perform their on-off functions at different times as the days progress, according to a solar time schedule, such for example as the "solar dial" described in prior British specification No. 395,813 (Horstmann and another).

To facilitate an understanding of the following description, one "on" and one "off" tappet will be prefixed with the word "solar" indicating that these tappets are automatically variable according to a solar or other time schedule as aforesaid, and the other "on" and "off" pair of tappets which operate between the solar "on" and solar "off" will be referred to as "intermediate" tappets. The need arises in the particular instance of a solar dial to render the second "on," i. e. the intermediate "on" ineffective should the solar "off," as the year progresses, anticipate the setting of the intermediate "on."

According to the said invention, a dial plate for a timing device of the type hereinbefore described, is provided with a pair of solar "on" and "off" tappets and a pair of adjustable intermediate "on" and "off" tappets, and also with a projecting peripheral edge subtending a requisite angle and extending circumferentially and trailing from the intermediate "off" tappet, said edge co-operating with the switch or valve operating mechanism to render the intermediate "on" operation thereof ineffective, and the intermediate "on" tappet is mounted on the dial for free movement in the direction of the dial's rotary movement so that it is capable of being pushed by the solar "off" tappet from its set time into the area of the said projecting peripheral edge should the solar "off" tappet arrive at a setting corresponding substantially with that of the intermediate "on" tappet.

The commencement of the projecting peripheral edge at the end which immediately follows the solar "on" tappet i. e. its leading end may advantageously constitute the intermediate "off" tappet, and this edge is preferably adjustable on the dial with a view (a) to varying the setting of the intermediate "off" tappet, (b) to varying the arcuate length of the edge (which provides the total period during which the switch mechanism cannot be operated to the "on" position), and (c) to provide a short time period between the end of the non-effective "on" condition and the setting of the intermediate "on" tappet.

In order that the said invention may be readily understood an embodiment thereof will be described in greater detail as applied to an electric time switch with the aid of the accompanying drawings, wherein:

Figure 1 is a face view of a dial according to the invention;

Figure 2 is a fragmentary plan to show the tappets (certain of the internal structure being omitted for clearness);

Figure 3 is an edge view of one of the tappets as seen at arrow A, Figure 1;

Figure 4 is an edge view of another of the tappets as seen at arrow B, Figure 1;

Figure 5 is a rear view of part of the dial shown in Figure 1 to illustrate the projecting peripheral edge;

Figure 6 is a plan of Figure 5 (internal structure omitted);

Figure 7 shows an electric switch mechanism capable of co-operating with the dial shown in Figure 1—various of the superimposed elements (which are in the "on" position) being hatched in different directions to assist in distinguishing one from another;

Figures 8, 9 and 10 are parts of the switch shown separately; and

Figure 11 shows the switch parts in the "off" position.

Dial and tappets

Referring first to Figures 1 to 6 of the drawings, it will be seen that the dial plate is a composite member built up from a number of concentric plates mounted on a central hollow sleeve 1 which fits on the arbor of the timepiece so as to be rotated thereby. Between the plates are cam devices for automatically varying the setting of the solar tappets, such devices and their operation being well known and forming no part of the present invention. As previously mentioned herein, an example of a "solar dial" incorporating devices for progressively and automatically varying the respective settings of a pair of tappets is to be seen in the said British prior specification No. 395,813. In the drawings the solar "off" tappet is designated 2 and the solar "on" tappet 3. There is provided an intermediate "on" tappet 4 which is rotatably carried on the sleeve 1 by the ring disc 5 and arm 6, and is adapted to be carried around by the dial to do its work by an adjustable screw 7 hereinafter referred to. The actual dial graduations are formed on a disc 8 secured to an outer plate of the assembly of concentric plates previously referred to. The time of the year at which the solar tappets are set is indicated in the window 9, and a toothed wheel 10 operable by a key is provided for initially setting these tappets. The intermediate "off" tappet is formed by the leading end 11 of a projecting peripheral edge generally denoted by the numeral 12 in Figure 1.

As will be seen in Figure 5, the projecting peripheral edge 12 is in the form of two or more arcuate slides 13 and 14 superimposed on one another and mounted on the back of the dial by means of screws 15 in the dial passing through arcuate slots 16 in the slides. This enables a composite peripheral edge to be built up of any desired circumferential length, within limits, so as to span a time interval, on a 24-hour dial, of say three and one-half hours to eight hours. For example, an intermediate "off" may be set to commence at any time selected between 10:30 o'clock p. m. and 1 o'clock a. m. by the leading edge 11, and terminate between 4:30 o'clock a. m. and 6:30 o'clock a. m. by the tappet 4. These adjustments are those hereinbefore described under the references (a) and (b). It will also be clear that the following or trailing end of the peripheral edge may be positioned according to the need for an adjustment such as that hereinbefore described under reference (c), i. e. between the trailing end of the edge 12 and the setting of tappet 4.

The solar tappets 2 and 3 are mounted quite independently of the projecting peripheral edge 12 so as to be set with automatic variation, and the intermediate "on" tappet 4 is manually settable at one of a plurality of positions within the times desired (e. g. between 4:30 a. m. and 6:30 a. m. as in the example given above). For this purpose an abutment screw 7 may be mounted in one of several spaced holes 17 in the face of the dial against which the tappet 4 pivoted on the dial centre as aforesaid may take a thrust seating so as to be pushed by the dial to do its work, but which enables the tappet to be pushed away by the following-up solar "off" tappet 2.

Switch mechanism

The construction of switch mechanism with which the dial plate of the invention co-operates is optional so long as it includes "on" and "off" levers projecting into the paths of the tappets, and is also designed so that the "on" lever can be rendered inoperative.

By way of example a suitable mechanism for operating a single pole electric switch is shown in Figures 7 to 11. The movable electric contact 18 is carried by a springy arm 19 solidly anchored to a post 20. It is adapted to be flexed to the "on" position of Figure 7 by the movement of a roller 21 carried by an insulating plate 22 (Figure 10) which latter is immovably secured to a lever 23 pivoted to the base 27 at 24. The roller unit 21—22—23 has an upstanding shelf 25 by which its movement is controlled.

Over the top of the roller unit is an "off" lever 26 (Figure 9) projecting into the paths of the tappets and pivoted to the base 27 at 28 and said lever 26 has a tooth 29 co-operating with the shelf 25, a toe 30 (for independent manual operation of the mechanism) and a pin 31 for moving a locking pawl 32 (Figure 8); this pawl is pivoted at 33 to the end of arm 34 of the bell-crank "on" lever whose other arm 35 projects into the path of the tappets.

The lever 26 has an upstanding pin 36 disposed in the path of the "off" tappets 11 and 2 and the lever arm 35 is disposed in a different plane in the path of the "on" tappets 3 and 4.

Tappet operation

At this point it will be useful to revert to the construction of the tappets (particularly Figures 2, 3 and 4). It will be seen that the solar "off" tappet 2 has a pin 37 projecting inwards (i. e. downwards with respect to Figure 1) and in a plane and at a radial distance so as to encounter the pin 36 of the "off" lever 26, and that the peripheral edge 12 with its "off" tappet end 11 is also in a plane to encounter said pin 36. The intermediate "on" tappet 4 has an inwardly projecting pin 38 and the solar "on" tappet 3 an outwardly projecting pin 39 both lying in a plane and at a radial distance to encounter the "on" lever 35. The solar "off" tappet 37 has a screw 40 adapted to engage the pin 41 on the intermediate "on" tappet 4 so as to push the latter if the solar tappet arrives at a position beginning to over-ride the setting of tappet 4. The pin 41 is adjustable along the arcuate slot 42 by the screw 43.

Switch operation

Turning once more to the switch and now to its operation by the switch mechanism, the movement of the dial is clockwise and, with the parts in the "on" position of Figure 7, an "off" tappet 2 or 11 trips the lever 26, releasing the pawl 32 and tooth 29 from the shelf 25 which allows the roller unit to move upwards about its pivot 24 under the action of the contact spring 19, opening the contacts to the "off" position of Figure 11. This leaves the nose of the pawl 32 pressing against the end of the shelf 25 under the action of a pawl spring 44. The "on" tappets 3 and 4 trip the lever 35 which moves anti-clockwise about its pivot and this lifts the pawl 32 which eventually snaps back on the shelf 25 under the action of the pawl spring 44, and the return of lever 35 under the action of a spring 45, causes the pawl to press on the shelf bringing down the roller 21 to press on the contact arm 19 and close the contacts 18 as in Figure 7.

During the movement of the lever arm 26 from the Figure 7 position to the Figure 11 position the pawl 29 is moved quite clear of the shelf 25 as shown in broken lines in Figure 11. The pawl 32 would normally drop back immediately into the full-line position as the tappet 2 trips past the lever 26. In the case of the tappet constituted by the end 11 of the peripheral edge 12, however, the pin 36 rides on the edge 12 as in the broken line position and holds the pawl 32 away from the shelf 25 against the force of the pawl spring 44. As a consequence any movement of the lever 34, 35 and pawl 32 is idle because the pawl cannot perform its pressing operation on the shelf 25 and thus the roller 21 cannot press the contact arm 19 into its "on" position. By this means, while the edge 12 is retaining the lever arm 26 against return to the Figure 7 position the operation of the "on" lever 35 by the tappet 4 is totally ineffective.

It will be clear, therefore, that if the tappet pin 38 of the intermediate "on" tappet 4 is pushed by the solar "off" tappet 2 into a position where it encounters the "on" lever 35 while the pin 36 of the lever 26 is riding on the edge 12, then it will idly trip past the lever 35. This takes place when the solar "off" tappet 2 has moved up to the time setting of the intermediate "on" tappet 4, when the former tappet will commence to push on the pin 41 (Figure 4) and carry the latter tappet into a sector where it is ineffective as the edge 12 is still holding off the pawl 32.

Hand operation

In common with most time switches, means are provided to operate the switch mechanism by hand for testing and other purposes. The rotary shaft 46 with finger knob 47 can turn a crank arm 48 carrying a pin 49. Movement of the crank clockwise engages the pin 49 with the toe 30 thus moving the parts into the Figure 11 position ("off"), and movement in the opposite direction engages the pin 49 with the top edge of the roller unit (Figure 10) pressing the roller on to the contact spring 19, the pawl 32 snapping back into the Figure 7 position ("on").

We claim:
1. Dial plate for a timing device employing a timepiece for driving said dial plate, the latter including a pair of solar and a pair of intermediate "on" and "off" tappets projecting from the dial plate periphery and adjustable therearound for actuating an associated on-off device, a projecting peripheral edge trailing from the intermediate "off" tappet subtending a requisite angle and extending circumferentially to co-operate with the associated on-off device for rendering the intermediate "on" operation thereof ineffective, the intermediate "on" tappet being mounted for free movement relatively to the dial in the direction of the dial's rotary movement, means for driving the said intermediate "on" tappet with the dial, and co-operating means between the solar "off" tappet and the intermediate "on" tappet to push the latter from its set time into the area of said projecting peripheral edge when the solar "off" tappet arrives at a setting corresponding substantially with that of the intermediate "on" tappet.

2. A dial plate according to claim 1 characterised in that the projecting peripheral edge is composed of a plurality of superimposed arcuate slides, means to adjust the various slides circumferentially in relation to one another, said projecting peripheral edge constituting by its leading end the intermediate "off" tappet.

3. A dial plate according to claim 1 in which there is provided an abutment member capable of being set in a variety of different positions on the dial, said abutment member co-operating with the intermediate "on" tappet to carry the latter around as the dial rotates.

4. A dial plate according to claim 1 in which there is provided an abutment member capable of being set in a variety of different positions on the dial, said abutment member co-operating with the intermediate "on" tappet to carry the latter around as the dial rotates, said abutment member being a screw which can be threaded into any one of several spaced holes provided in the face of the dial.

5. A dial plate according to claim 1 in which the solar "off" tappet is provided with a pin for engagement with an abutment on the intermediate "on" tappet.

6. A dial plate according to claim 1 in which the solar "off" tappet is provided with a pin for engagement with an abutment on the intermediate "on" tappet said abutment being a pin adjustable along an arcuate slot in said tappet.

References Cited in the file of this patent

UNITED STATES PATENTS

| | | |
|---|---|---|
| 1,129,996 | McCabe | Mar. 2, 1915 |
| 1,524,461 | Speer | Jan. 27, 1925 |
| 1,710,367 | Luczak | Apr. 23, 1929 |
| 2,368,005 | Crise | Jan. 23, 1945 |
| 2,598,196 | Staley | May 27, 1952 |

FOREIGN PATENTS

| | | |
|---|---|---|
| 891,212 | France | Nov. 29, 1943 |